3,074,854
OMEGA HYDROXYLATION OF
CARBOXYLIC ACIDS
Kenneth C. Robbins, Chicago, Ill., assignor, by mesne assignments, to Armour & Company, a corporation of Delaware
No Drawing. Filed May 5, 1960, Ser. No. 26,962
6 Claims. (Cl. 195—30)

This invention relates to the omega hydroxylation of monocarboxy compounds, and in particular, relates to direct in vitro enzymatic omega hydroxylation of straight chain normal monocarboxylic acids and their salts and esters, by liver tissue homogenates.

The following illustrates the reaction:

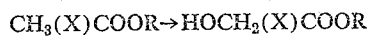

$$CH_3(X)COOR \rightarrow HOCH_2(X)COOR$$

wherein X is a group having 6 to 16 carbon atoms plus hydrogen atoms not to exceed 32, and R is hydrogen, an alkyl group, or a metallic cation.

The novel process of this invention provides a method of directly hydroxylating long straight chain carboxy compounds. Generally this hydroxylation of the omega methyl group of a suitable substrate is catalyzed by a liver microsomal oxygenase system activated by cofactors in the presence of molecular oxygen.

Suitable substrates which may be employed in this conversion are unbranched, terminally saturated carboxy compounds having 8 to 18 carbon atoms. Monocarboxylic acids, salts and esters form the class of compounds converted by the process of this invention. Unsaturated as well as saturated compounds are suitable substrates, however, it is necessary that the terminal, omega group be saturated.

The enzyme system catalyzing the conversion may be classified as an oxygenase system. This oxygenase activity is largely centered in the microsomal fraction of liver tissue cells.

Whole liver tissue homogenates, referring to broken cell suspensions, including all subcellular particulates and soluble fractions exhibit omega hydroxylation activity. However, competing beta oxidation systems contained in cell mitochondria generally overshadow the omega reaction. Therefore, although whole tissue homogenates are functional, it is desirable that the mitochondria be removed from homogenates employed in this conversion.

Certain cofactors are preferably used for efficient conversion; these include the nicotinamide coenzyme and molecular oxygen. In the case of the liver microsomal oxygenase system, TPNH (TPNH referring to the reduced form of triphosphopyridine nucleotide) and molecular oxygen are the preferred cofactors. The TPNH may be furnished by a TPNH-generating system contained in the soluble fraction of liver cells. Magnesium ions ($Mg^{++}$) and oxidized triphosphopyridine nucleotide ($TPN^+$) added to the TPNH-generating system of the soluble fraction serve to react so as to convert the added $TPN^+$ to TPNH used by the microsomal oxygenase system. It becomes apparent that by including the cellular soluble fractions and $Mg^{++}$ as a cofactor, $TPN^+$ will replace TPNH as the cofactor. Although I prefer to use TPNH, DPNH (reduced diphosphopyridine nucleotide) can also be satisfactorily used. Therefore either of the nicotinamide coenzymes are operable but about 5 times as much DPNH as TPNH is required for comparable conversion.

TPNH concentration of 1 to $4\mu$ M per ml. of reaction system is optimum. Concentrations less than $1\mu$ M per ml. will adversely affect conversion, but amounts far in excess of $4\mu$ M per ml. will to some extent increase reaction yields.

It is essential that aerobic conditions be established for maximum yields of end-product. If oxygen is not supplied in abundance reduced yields will likely result.

Generally alkaline pH levels should be established for best yields. A range of from about pH 6.5 to 9.5 is preferable, although a pH as low as about 5.0 and as high as 10.0 is operable. Denaturization of the microsomal particulates with resulting impairment of hydroxylation, will occur if reactions are attempted outside this pH range.

Hydroxylation may be accomplished at any temperature within the range of from about 0° to 60° C. I prefer to use a temperature of 37° C. Temperatures in excess of 60° C., will gradually inactivate the microsomal and soluble fraction enzyme systems. And of course temperatures below 37° C. impede rate of reaction.

Certain reagents which act to complex heavy metal ions may be used to increase conversion yields. Heavy metal ions appear to inhibit hydroxylation. Ethylene diamine-tetra-acetic acid (EDTA), cyanide, and pyrophosphate increase yield of hydroxylated end products. I prefer to use EDTA and potassium cyanide in combination. The limiting factor in the hydroxylation reaction appears to be the oxidation of TPNH to $TPN^+$. Potassium cyanide inhibits this reaction while enhancing hydroxylation. EDTA also enhances conversion. A ratio of .174 mg. of TPNH, $3.3\mu$ M KCN and 0.0017 M EDTA per ml. increases conversion by about 30%.

Any of the common methods of separating cell components may be used in obtaining the oxygenase system employed in this invention. Generally these methods include mechanical reduction of organ tissue to rupture the cells, followed by differential centrifugation to separate the various subcellular particulates. For small scale operations grinding of the tissue, as by a Potter-Elvehjem homogenizer, followed by centrifugation at from 10,000 to 50,000 g, g being the force of gravity, yields suitable preparations which contain the microsomal and soluble fractions. Centrifugation at 10,000 g removes large cellular particulates, leaving essentially the microsomes and soluble fractions while forces of 50,000 g will remove microsomes which contain required conversion activity.

In the preferred practice of this invention large scale methods of preparing tissue homogenates and subjecting these homogenates to differential centrifugation are normally employed. One such method of preparing large quantities of the tissue particulates is the following procedure. Fresh animal livers are washed in ice-cold 0.15 M NaCl and cut into small pieces. Grinding in a refrigerated standard meat chopper through a ⅛ inch plate serves to disrupt tissue cells. Regrinding gives better results. A 10% suspension in appropriate suspending media is desirable. A satisfactory suspending medium is 0.25 M sucrose containing 0.001 M EDTA. The suspension is stirred at about 2° C. for from 15 to 30 minutes. After filtering or settling for 15 minutes the suspension is decanted to remove most of the unbroken cells and cell debris before centrifugation.

The liver homogenates after settling or filtration may be centrifuged in an International Centrifuge, size 3, No. 258 head at 1250 g (2,000 r.p.m.) for 15 minutes at 4° C. The resulting supernatant is then further centrifuged in a model T–1 Sharples Super-Centrifuge at 13,200 g (23,000 r.p.m.) using a standard clarifier rotor (1 HO at a feed rate of up to 100 ml. per minute at 4° to 6° C. The precipitate contains the mitochondrial fraction. This large scale differential centrifugation method can be operated continuously to prepare cell particulates and soluble fractions.

Examples of suitable substrates for this conversion are (1) saturated normal carboxylic acids having 8 to 18 carbon atoms, their salts and their esters; including caprylic, pelargonic, capric, hendecanoic lauric, tridecanoic, myristic, pentdecanoic, palmitic acids; (2) unbranched unsaturated acids which are terminally saturated, and their salts and esters; such as $\Delta^5$-decylenic acid, oleic, palmitoleic, and linoleic acids; (3) natural products such as fatty acids obtained from meat fats and palm coconut, cotton seed, lard and fish oils.

I prefer to use a substrate concentration of about $0.33\mu$ M per ml. Although this range is operable over wide limits very high concentrations will inhibit the hydroxylation reaction. A microsomal concentration equivalent to the particulate and soluble fractions extracted from about 30 to 80 mg. of organ tissue per ml. of reaction system is optimum. This concentration may be widely varied without marked adverse results.

The reaction products derived as described hereinbefore are useful intermediates in the synthesis of the many compounds, such as large ring lactones possessing fragrances usable in perfumes and polymerizing properties useful in plastics manufacture.

The following specific examples will serve to further illustrate this invention.

*Example I*

A homogenate yielding a preparation having excellent hydroxylation conversion activity was prepared by the following procedure.

Hog livers were chilled in 0.25 M sucrose at 0° C. The chilled organs after draining were minced. One part of tissue was suspended in nine parts of cold 0.25 M sucrose solution. A temperature of 2° C. was maintained throughout all fractionation steps. This tissue suspension was then homogenized for 2 minutes in a Potter-Elvehjem homogenizer in which a fitted cylindrical pestle was rotated within a tube. The homogenized preparation was then subjected to differential centrifugation. Centrifugation at about 20,000 g for 10 minutes resulted in removal of cell nuclear and mitochondria fractions.

After removal of the mitochondria fraction the supernatant containing the soluble and microsomal fractions were separated by clumping methods. Calcium chloride solution was added to the supernatant to give a final concentration of 0.01 M $CaCl_2$. The $CaCl_2$ causes clumping of the residual particulates suspended in the supernatant allowing them to be more easily removed by centrifugation. After allowing the $CaCl_2$ treated supernatant to stand for one hour the suspension was centrifuged in a Sharples centrifuge at 13,200 g at 4° C. The precipitate contained the microsomal fraction; the supernatant the soluble fraction. The microsomes were washed with 0.25 M sucrose and 0.001 M EDTA followed by suspension and 0.05 suspension in 0.05 M trishydroxymethyl-aminomethane buffer and 0.001 EDTA, pH 7.4.

Various concentrations of TPNH were used to study the conversion of decanoic acid to 10-hydroxy decanoic acid by the washed rat liver microsomes. Three ml. systems consisting of the following were prepared: $200\mu$ M, pH 7.4 tris buffer; $1\mu$ M decanoic radio active $C^{14}$ acid; 30 mm. nicotinamide; 250 mg. tissue equivalent. The 3 ml. systems were reacted at 37° C. on a Dubnoff metabolic shaking incubator.

| Experiment No. | TPNH Concentration per mm. per 3 ml. | Percent Conversion per hour |
| --- | --- | --- |
| 1 | 1.0 | 3.0 |
|   | 2.0 | 5.7 |
|   | 4.0 | 12.3 |
| 2 | 2.0 | 8.2 |
|   | 10.0 | 18.6 |
|   | 20.0 | 12.2 |
| 3 | 4.2 | 18.5 |
|   | 4.0 | 12.8 |

End product conversion was determined by isotope tracer techniques, and identity proven by both chromatographic and enzymatic methods.

*Example II*

The effect of different pyridine nucleotides on the conversion of decanoic acid to 10-hydroxy decanoic acid by washed rat liver microsomes was studied. The same systems as described in Example I were used except that the pyridine nucleotide was varied. A 250 mg. tissue equivalent of microsomes was used.

| Exp. No. | Pyridine Nucleotide | Concentration M per 3 ml. | Percent Conversion per Hour |
| --- | --- | --- | --- |
| 1 | TPNH | 2.0 | 8.2 |
|   | DPNH | 4.6 | 3.3 |
|   | TPN | 2.5 | 0.4 |
|   | TPN+Generating System [1] | 5.0 | 2.2 |
| 2 | TPNH | 4.0 | 12.8 |
|   | TPNH+ | 2.0 |  |
|   | TPN | 2.4 | 7.1 |
|   | DPNH | 7.2 | 3.9 |
|   | DPNH+ | 3.6 |  |
|   | TPN | 2.4 | 7.5 |
|   | TPNH+ | 2.0 |  |
|   | Tetrahydrofolic Acid | 0.2 | 5.2 |

[1] TPNH generating system: glucose 6-phosphate+glucose 6-phosphate dehydrogenase (yeast).

The foregoing detailed description has been given for clearness of understanding only and no unnecessary limitations should be understood therefrom, for obvious modifications which do not depart from the spirit of this invention will occur to a person skilled in the art.

I claim:

1. The process of in vitro hydroxylation by contacting a terminally saturated straight chain normal hydrocarbon monocarboxylic acid having 8 to 18 carbon atoms with the microsomal fraction of animal liver tissue homogenates.

2. The process of converting a terminally saturated straight chain normal hydrocarbon monocarboxylic acid having 8 to 18 carbon atoms to the corresponding omega-hydroxy compound by contacting said acid with animal liver tissue fractions remaining in the supernatant of a broken cell suspension subjected to centrifugal forces of at least 10,000 g but not exceeding 50,000 g.

3. The process of in vitro hydroxylation by contacting a terminally saturated straight chain normal hydrocarbon monocarboxylic acid having 8 to 18 carbon atoms to form corresponding straight chain terminal hydroxylated compounds with animal liver tissue cell fractions remaining in a broken cell suspension subjected to centrifugation at a force of not more than 50,000 g to thereby catalyze said hydroxylation, and adding cofactors including a nicotinamide coenzyme and molecular oxygen.

4. The process of enzymatic conversion by contacting a terminally saturated straight chain normal hydrocarbon monocarboxylic acid having 9 to 13 carbon atoms to the corresponding straight chain terminal hydroxylated compound with animal liver tissue cell fractions including the soluble fractions and microsomes and adding cofactors including a nicotinamide coenzyme and molecular oxygen.

5. The process of claim 4 wherein decanoic acid is converted to 10-hydroxy decanoic acid.

6. A process of enzymatic hydroxylation by contacting a terminally saturated straight chain normal hydrocarbon monocarboxylic acid having 8 to 18 carbon atoms to the corresponding straight chain terminally hydroxylated compound with animal liver tissue dialyzed microsomes and soluble fractions, magnesium ions, and oxidized triphosphopyridine nucleotide.

References Cited in the file of this patent

Deuel: "Lipids," vol. III, Interscience Publishers, Inc., N.Y. (1957), pp. 101–110.

Downes: "The Chemistry of Living Cells," Harper and Brothers, publishers, N.Y. (1955), pp. 460–463.